Oct. 10, 1967 K. SECUNDA 3,346,476
ELECTROCHEMICAL STOCK REMOVAL APPARATUS INCLUDING MEANS
TO DISPENSE ELECTROLYTE AT CRITICAL PARTS
Filed Nov. 27, 1963

INVENTOR.
Kenneth Secunda
BY
Hugh L. Fisher
ATTORNEY

United States Patent Office 3,346,476
Patented Oct. 10, 1967

3,346,476
ELECTROCHEMICAL STOCK REMOVAL APPARATUS INCLUDING MEANS TO DISPENSE ELECTROLYTE AT CRITICAL PARTS
Kenneth Secunda, Detroit, Mich., assignor to General Motors Corporation, Detroit, Mich., a corporation of Delaware
Filed Nov. 27, 1963, Ser. No. 326,607
8 Claims. (Cl. 204—224)

ABSTRACT OF THE DISCLOSURE

Electrical stock removal apparatus incorporating a cutting tool electrode with a through flow passage for machining fluid to the machining area. The cutting tool electrode includes a fluid flow directing member that is insertable into the flow passage through the electrode for directing the machining fluid to critical parts of the electrode machining surface to facilitate machining.

This invention relates to electrical stock removal apparatus, and more particularly to improvements in cutting tool electrodes for use with the apparatus.

In the process of electrically removing stock from a conductive workpiece, e.g., electrochemical machining, the proper distribution of the electrolyte within the machining gap between the cutting tool and the workpiece is important. If, during the process and particularly when the cutting tool is being seated within the workpiece, insufficient electrolyte is supplied at any time to an area, undesired sparking will occur in this electrolyte starved area. Such sparking can damage either or both the cutting tool and the workpiece. To avoid sparking often the feed is reduced and the supply voltage increased, but this produces overcut which is also undesirable.

To overcome these problems electrical stock removal apparatus incorporating a novel cutting tool electrode structure is proposed for facilitating the distribution of machining fluid to critical areas so that more effective electrical stock removal can be achieved. More specifically, the invention contemplates a cutting tool electrode having a fluid conducting passageway in which a removable fluid directing member is positioned for directing fluid to certain critical areas along the electrode machining surface.

The foregoing and other objects and advantages of the invention will become apparent from the following description and from the accompanying drawings, in which.

Figure 1:
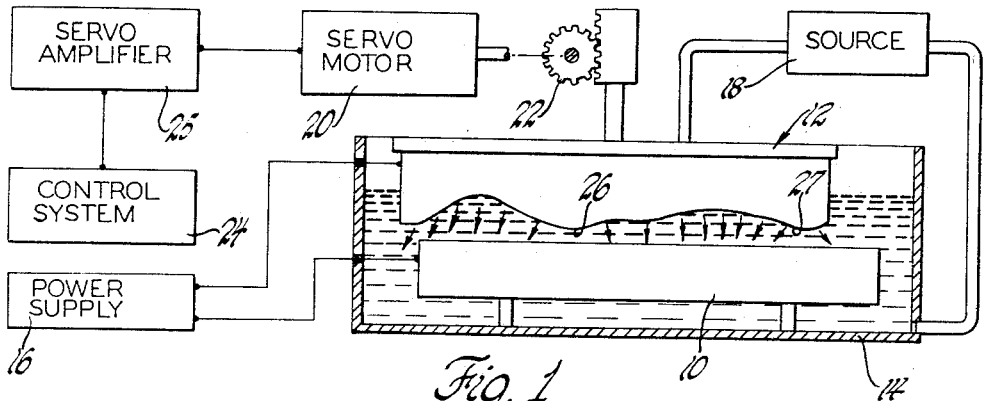
FIGURE 1 is a schematic illustration of apparatus used to demonstrate the invention.

Referring now to the drawings in detail and initially to FIGURE 1, the apparatus illustrated shows a pair of electrodes 10 and 12, which will hereinafter be designated respectively as the workpiece and the cutting tool. The workpiece 10 is suitably positioned within a tank 14 to which is supplied a machining fluid. If the process involved is electrochemical machining, the fluid will be an electrolyte, but if the process is that known as electrical discharge machining, the fluid will have dielectric characteristics.

For demonstration purposes only electrochemical machining apparatus is shown; hence, a direct current is supplied by a power supply 16 to the gap formed between the workpiece 10 and the cutting tool 12. Electrolyte is provided from some suitable source 18, and the proper gap spacing is maintained by a servomotor 20 through the agency of gearing 22 or the equivalent. The servomotor 20 is in turn operated by a suitable control system 24 and a servo amplifier 25 such that the cutting tool electrode 12 is fed towards the workpiece 10 at some optimum rate. If preferred, the workpiece 10 can be fed towards the cutting tool 12. The control system 24 may be of the type disclosed in United States Patent No. 3,275,538, entitled "Electrochemical Machining Method and Apparatus" and issued Sept. 27, 1966. As is well understood by those versed in the art, when passing current through the electrolyte between the anodic workpiece 10 and the cathodic cutting tool 12, the work surface of the workpiece 10 will gradually assume the contour of the adjacent machining surface of the cutting tool 12 due to the electrochemical action, which in effect dissolves the workpiece surface.

Figure 2:
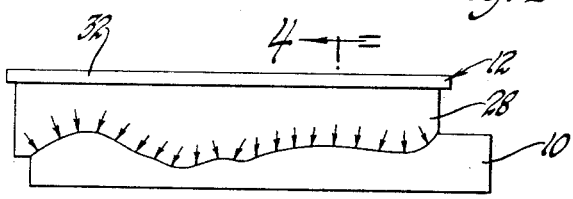
FIGURE 2 shows a cutting tool electrode incorporating the principles of the invention. The cutting tool electrode is shown in a seated position with respect to a workpiece.

If in initiating the process the workpiece 10 has the flat surface illustrated in FIGURE 1 and the adjacent machining surface of the cutting tool 12 has the irregular contour also displayed in FIGURE 1, there is an initial seating required before the relative positions displayed in FIGURE 2 are achieved wherein the gap spacing at any point between the faces of the workpiece 10 and the cutting tool 12 is substantially the same. During this seating step the flow of the electrolyte is very critical because at certain points the machining surface of the cutting tool 12 is closer to the working surface of the workpiece 10 than at others. Under normal circumstances with the electrolyte being fed by the source 18 through the cutting tool 12, the electrolyte will flow most rapidly from the remotest parts of the cutting tool 12, as indicated by the arrows. The closest points, e.g. at 26 and 27, are electrolyte starved; consequently, sparking occurs and as has been mentioned this can produce undesired effects, such as damage either to the workpiece 10 or the cutting tool 12, or both. If it is attempted to reduce the feed while increasing the voltage to overcome the sparking, overcut results, i.e., the workpiece 10 is cut oversize.

Figure 3:
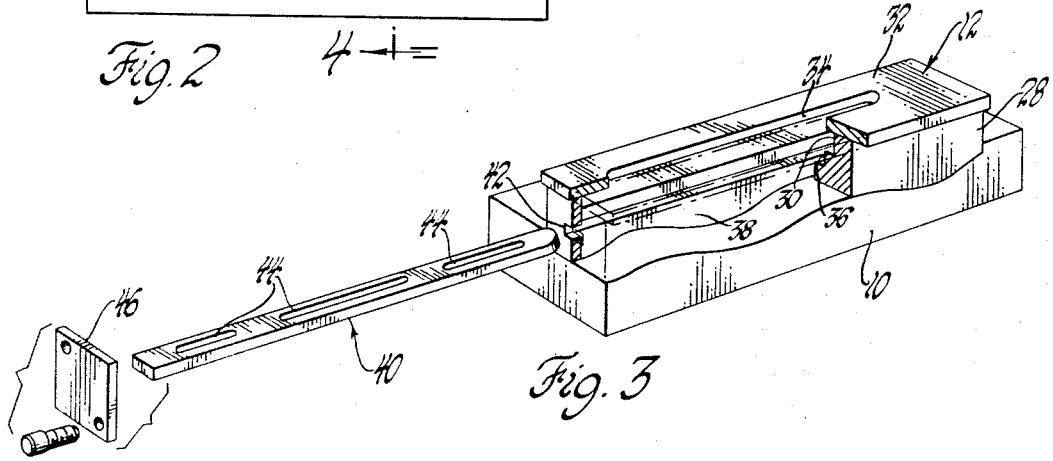
FIGURE 3 is an exploded perspective view of the cutting tool electrode.
Figure 4:
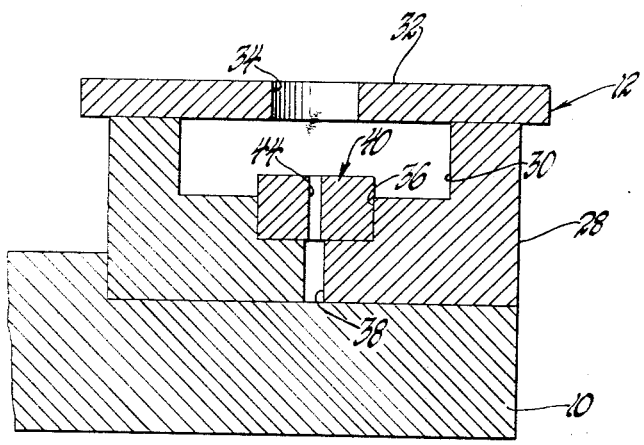
FIGURE 4 is a sectional view of the cutting tool electrode taken along line 4—4 of FIGURE 2.

These problems have been solved by the cutting tool structure best illustrated in FIGURES 3 and 4. As seen in FIGURE 3, the cutting tool 12 includes a body 28 formed with an elongated passageway or chamber 30. Covering this chamber 30 is a top plate 32 that is afforded with an elongated inlet 34. The inlet 34 is adapted to communicate with the source 18 in any conventional way. At the bottom of the chamber 30 is a seating slot 36 that intersects an elongated outlet 38 to the machining surface of the cutting tool 12. The seating slot 36 receives a fluid deflecting or flow directing member 40 that is inserted through an opening 42 in the side of body 28. This opening 42 is aligned with the seating slot 36 such that the fluid deflecting member 40, when inserted into the electrode, will assume the FIGURE 4 position, serving to control electrolyte communication between the chamber 30 and the outlet 38.

The fluid deflecting member 40 in this embodiment is shown with three fluid deflecting openings 44. The number and the relative position of these openings, of course, can be varied to meet different requirements. Once the fluid deflecting member 40 is inserted through the opening 42 and in position in the seating slot 36, a side cover 46 is installed to the side of the body 28 and maintains the fluid deflecting member 40 in position. The cover 46 also affords a satisfactory seal such that the electrolyte cannot escape through the opening 42. The side cover 46 facilitates the disassembly of the fluid deflecting member 44 without any need for altering the cutting tool 12 or requiring that the cutting tool 12 be disconnected from the gearing 22 and removed from the apparatus.

Once the fluid deflecting member 40 is in position, electrolyte flowing from the source 18 through the inlet 34 in the top plate 32 proceeds to the chamber 30 in the body 28 of the cutting tool 12 and then exits via openings 44 in the member 40, through the outlet 38. The relative sizes are selected so that the closest areas between the surfaces of the cutting tool 12 and the workpiece 10 are adequately supplied with electrolyte, thus insuring that the cutting tool 12 can be quickly seated to the FIGURE 2 position relative to the workpiece 10 without concern for sparking or without the need for making adjustments that would slow up the process and produce the unwanted overcut.

Actually, more than one fluid deflecting member 40 may be utilized to maintain the fluid direction wanted. Moreover, as the process proceeds and the electrolyte distribution requirements change, different fluid deflecting members 40 can be installed. If once the cutting tool 12 is seated and there is no further need for the fluid deflecting member 40, it is easily removed. Thereafter, substantially the same flow is permitted all along the machining surface, assuming the configuration of the outlet 38 is for this purpose, i.e., a constant width and extends the length of the cutting tool 12. Also, it should be kept in mind that the described electrode structure can be used to advantage in the electrical discharge machining process whenever fluid starvation presents a problem.

The invention is to be limited only by the following claims.

What is claimed is:

1. An electrode for electrically removing stock from a conductive workpiece comprising a body including a machining surface, an inlet, an outlet extending to the machining surface, a fluid conducting passageway interconnecting the inlet and outlet, and a seat in the passageway, and a fluid flow directing member slidably positioned on the seat, the fluid flow directing member having openings therein for controlling fluid flow through the outlet and to the machining surface.

2. An electrode for electrically removing stock from a conductive workpiece comprising a body having a machining surface, a fluid chamber therein, an outlet passage extending from the chamber to the machining surface, and a seat between the fluid chamber and the outlet passage, and a fluid flow directing member slidably positioned within the body and on the seat and having fluid deflecting portions for controlling fluid flow from the fluid chamber to the machining surface.

3. An electrode for electrically removing stock from a conductive workpiece comprising a body having a machining surface and a fluid chamber therein, the fluid chamber having an inlet and an outlet, the outlet extending to and being in fluid communication with the machining surface, and a seating slot positioned between the chamber and the outlet, a fluid flow directing member slidably positioned on the seating slot and having a fluid flow deflecting member for directing fluid to certain selected areas of the machining surface, and closure means maintaining the member positioned within the seating slot.

4. An electrode for electrochemically machining a conductive workpiece comprising a body having a machining surface, an electrolyte chamber, and a seating slot providing communication between the chamber and the machining surface, a fluid directing member slidably positioned within the slot and having openings therein so arranged as to direct the electrolyte from the electrolyte chamber to certain selected areas of the machining surface, and a cover for sealingly holding the member within the slot.

5. An electrode for electrochemically machining a conductive workpiece comprising a body having a machining surface therein and an electrolyte chamber provided with an inlet and an outlet in the machining surface, the body also including a slot extending through and intersecting the outlet, a fluid directing member slidably positioned within the slot and having openings therein for directing the electrolyte from the chamber through the outlet to certain selected areas along the machining surface of the electrode, and a cover for sealingly maintaining the fluid deflecting member situated within the slot.

6. In the electrical stock removal apparatus, the combination of conductive cutting tool and workpiece electrodes spaced apart so as to form a machining gap therebetween, a source of machining fluid, and a source of electrical power connected across the gap so as to effect stock removal from the workpiece electrode, the cutting tool electrode having a fluid conducting through passageway therein communicating with the source of machining fluid and extending to the gap, a seat in the passageway, and a fluid flow directing member slidably positioned on the seat, the fluid flow directing member having fluid deflecting portions for controlling fluid flow to the gap.

7. In electrical stock removal apparatus, the combination of conductive cutting tool and workpiece electrodes spaced apart so as to form a machining gap therebetween, a source of machining fluid, and a source of electrical power connected across the gap so as to effect stock removal from the workpiece electrode, the cutting tool electrode having a machining surface adjacent the workpiece, a fluid chamber communicating both with the source of machining fluid and the machining surface, a seat between the fluid chamber and the machining surface, and a fluid flow directing member slidably positioned within the electrode and on the seat, the fluid directing member having openings therein for directing fluid to certain selected areas of the workpiece.

8. In electrochemical machining apparatus, the combination of conductive cutting tool and workpiece electrodes spaced apart so as to form a machining gap therebetween, a source of electrolyte, and a source of electrical power connected across the gap so as to generate stock removal from a workpiece, the cutting tool electrode having a chamber therein communicating with the source of electrolyte, an opening between the chamber and the gap, a slot intersecting the opening, a fluid directing member slidably positioned within the slot and having openings therein for directing the electrolyte from the chamber through the opening to certain areas of the workpiece, and a cover for sealingly maintaining the fluid directing member within the cutting tool electrode.

References Cited
UNITED STATES PATENTS

| | | | |
|---|---|---|---|
| 2,745,805 | 5/1956 | Jones | 204—279 |
| 2,766,482 | 10/1956 | Heibel | 117—212 |
| 3,202,595 | 8/1965 | Inoue | 204—224 |
| 3,208,923 | 9/1965 | Feiner et al. | 204—143 |
| 3,268,434 | 8/1966 | Weingartner | 204—143 |
| 3,271,291 | 9/1966 | Crawford et al. | 204—224 |

JOHN H. MACK, *Primary Examiner.*

HOWARD S. WILLIAMS, ROBERT K. MIHALEK,
*Examiners.*